United States Patent [19]

Shono et al.

[11] Patent Number: 5,747,136
[45] Date of Patent: May 5, 1998

[54] HIGH-DENSITY MAGNETO-OPTIC DISK AND METHOD OF MANUFACTURING THE SAME

[75] Inventors: Keiji Shono; Yasunobu Hashimoto; Sumio Kuroda; Ken Tamanoi, all of Kawasaki, Japan

[73] Assignee: Fujitsu, Ltd., Kawasaki, Japan

[21] Appl. No.: 309,966

[22] Filed: Sep. 20, 1994

Related U.S. Application Data

[63] Continuation of Ser. No. 16,544, Feb. 11, 1993, abandoned.

[30] Foreign Application Priority Data

Feb. 14, 1992 [JP] Japan ................................ 4-027699

[51] Int. Cl.$^6$ ............................................. G11B 5/66
[52] U.S. Cl. ................................. 428/64.3; 428/694 GT; 428/694 MM; 428/694 EC; 428/694 RL; 428/900; 369/283; 360/135
[58] Field of Search .................. 428/694 GT, 694 MM, 428/694 EC, 694 RL, 800, 64.3; 369/283; 360/135

[56] References Cited

U.S. PATENT DOCUMENTS

| | | | |
|---|---|---|---|
| 4,628,485 | 12/1986 | Tanaka et al. | 365/122 |
| 4,701,881 | 10/1987 | Tanaka et al. | 365/122 |

FOREIGN PATENT DOCUMENTS

| | | |
|---|---|---|
| 3-93056 | 4/1991 | Japan. |
| 3-93058 | 4/1991 | Japan. |

OTHER PUBLICATIONS

Suzuki et al "Magnetic and MO Properties of Bi–Substituted Garnet Films Crystallized by Rapid Thermal Processing" (Abstract) 1989.

Abe et al "MO Recording on Garnet Films" *J. Mag. and Magnetic Materials* 84(1990) pp. 222–228.

M. Kaneko et al., "Multilayered Magneto–Optical Disks for Magnetically Induced Superresolution", *Proc. Int. Symp. on Optical Memory*, pp. 203–210, (1991).

K. Shono et al., "Magneto–Optical Recording of Sputtered Garnet Films Crystallized During Deposition", *Mat. Res. Soc. Symp. Proc.*, vol. 150, pp. 131–135, (1989).

H. Kano et al., "Optimized Structure of Sputtered Garnet Disks", *IEEE Transactions on Magnetics*, vol. 25, pp. 3737–3742 (1989).

K. Shono et al., "Magneto–Optical Recording of Sputtered Garnet Films Using Laser Diode", *IEEE Transactions on Magnetics*, vol. Mag–23, pp. 2970–2972, (1987).

*Primary Examiner*—Leszek Kiliman
*Attorney, Agent, or Firm*—Armstrong, Westerman, Hattori, McLeland & Naughton

[57] ABSTRACT

A magneto-optic disk has a readout layer formed of a bismuth-substituted garnet having a chemical composition represented by $Bi_x R_{3-x} M_y Fe_{5-y} O_{12}$ and a recording layer formed of a nonbismuth-substituted garnet having a chemical composition represented by $R_3 M_y Fe_{5-z} O_{12}$ (where $0 \leq x \leq 3$, $0 \leq y < 2$, $0 \leq z < 2$, R represents yttrium or a rare earth element, and M represents element which can be substituted for iron (Fe). The readout layer has a smaller coercive force and a higher Curie temperature in comparison with the recording layer, and exhibits a characteristic of a large angle of Faraday rotation 200 times that of the recording layer with respect to a short-wavelength laser beam of about 500 nm. Therefore, the MSR technique utilizing masking of the recording layer with the readout layer can be applied to this magneto-optic disk to achieve a high recording density about 16 times that in the case of a magneto-optic disk having an amorphous alloy thin film formed of a rare earth element and a transition metal and effective with respect to a laser beam of a comparatively long wavelength about 800 nm.

1 Claim, 4 Drawing Sheets

HIGH-DENSITY MAGNETO-OPTIC DISK AND METHOD OF MANUFACTURING THE SAME

This application is a continuation of application Ser. No. 08/016,544 filed Feb. 11, 1993, now abandoned.

BACKGROUND OF THE INVENTION

1. Field of the Invention

This invention relates to a magneto-optic disk, and more particularly, to a magneto-optic disk using a recording medium having a garnet film.

2. Description of the Related Art

The effective recording density of a magneto-optic disk is determined by the size of a laser beam spot on the disk surface at the time of readout. This spot size depends upon the wavelength of the laser beam and the numerical aperture of an objective lens for projecting the beam. If a laser beam having a shorter wavelength of 400 nm is used, the recording density can be quadrupled in comparison with a case of using a laser beam having a wavelength of about 800 nm. However, there are limitations upon reducing the wavelength of laser beam and increasing the numerical aperture of the objective lens. In the present magneto-optic recording apparatuses, therefore, the laser beam cannot be converged enough to form a spot corresponding to the size of a magnetic flux reversal region attainable in the present perpendicular magnetic recording technologies. On the other hand, a technique using an effect of "magentically induced superresolution (MSR)" has been proposed. (See Japanese Patent Laid-Open Publication Nos. 393056 and 3-93058 and Proc. Int. Symp. on Optical Memory. 1991, pp.203 to 210.).

This MSR technique resides in using, as a magneto-optic recording medium, an amorphous alloy film formed of a rare earth element and a transition metal, and forming this medium into a two-layer structure in which a recording layer and a readout layer are magnetically coupled with each other by exchange interaction. The recording layer is formed of a material having a coercive force greater than that of the readout layer. According to this MSR technique, the effective recording density can be increased by using an optical system presently available. The principle of this MSR technique will be described below with reference to FIGS. 1(a) and 1(b).

As shown in FIG. 1(a), recording, i.e., writing, is performed in the same manner as the ordinary magneto-optic recording. That is, a laser beam 1 from a semiconductor laser source is converged onto a magneto-optic recording medium 2 so that the temperature of the medium 2 is increased above the Curie temperature (Tc). In this state, magnetization is reversed with a bias magnet (not shown). Ordinarily, a temperature profile in a region of the magneto-optic recording medium 2 irradiated with the laser beam 1, i.e., a region as defined within a circle formed by a laser spot 3, has a Gaussian distribution, as represented by a curve a in FIG. 1(b). Accordingly, in this recording, the power for producing the laser beam 1 is controlled so that the temperature is higher than the Curie temperature only in a region 21 where magnetization reversal is to be caused.

The magneto-optic recording medium 2 has a two-layer structure having a readout layer 4 and a recording layer 5, as shown in FIG. 2. These two layers 4 and 5 are magnetically coupled by exchange interaction. In the readout layer 4, magnetization reversal is caused with the magnetic field for the above-described writing in the recording layer 5 having a greater coercive force, and the direction of magnetization in the readout layer 4 is thereby set uniform with that in the recording layer 5. In this manner, a recording mark 8, i.e., a unit bit, is formed on the magneto-optic disk 7. According to the present magneto-optic recording techniques, recording marks 8 having a diameter which is ½ or ⅓ of that of the laser spot 3 can be written.

For reproduction, i.e., readout, magnetization reversal is selectively caused in the readout layer having a smaller coercive force with an initialization magnet 6. The direction of magnetization in the readout layer 4 is thereby set uniform with the direction of the magnetic field of the initialization magnet 6. However, since the direction of magnetization in the recording layer 5 is not changed, information represented by recording marks 8 is maintained. In this state, the information in the recording layer 5 cannot be read out because it is masked with the readout layer 4.

When each recording mark 8 masked in this manner reaches the position to be irradiated with the laser spot 3 with the rotation of the magneto-optic disk 7 in the direction of arrow A, the corresponding portion of the readout layer 4 is heated and the temperature thereof is increased. The coercive force of the readout layer 4 is thereby reduced. As a result, magnetization reversal is caused in this portion of the readout layer 4 by the force of exchange coupling with the recording layer 5. That is, information in the recording layer 5 is copied to the readout layer 4. At this time, in the temperature distribution in the readout layer 4, the temperature is highest in a region as defined within an ellipse which overlaps the laser spot 3 in FIG. 2, because of a time lag of the temperature rising and the rotation of the magneto-optic disk 7. Accordingly, if the power for the laser beam 1 is controlled so that this region (high-temperature region) has a temperature equal to the lower limit of the temperature range in which magnetization reversal can be caused in the readout layer 4, recording marks 8 which are irradiated with the laser spot 3 but located out of the high-temperature region can remain masked. Thus, recording marks 8 arranged at a pitch smaller than the diameter of the laser spot 3 can be read.

SUMMARY OF THE INVENTION

A bismuth-substituted garnet type magneto-optic recording mediums containing a rare earth element or yttrium and having bismuth substituted for a part of such an element have a larger angle of Faraday rotation with respect to visible light between red and blue in comparison with the above-mentioned amorphous alloy magneto-optic recording medium and, in general, have a large coercive force and a high squareness ratio. Specifically, a bismuth-substituted garnet film formed by sputtering has improved perpendicular magnetic anisotropy and, therefore, attracts attention as a high-density magneto-optic recording medium for use with short-wavelength laser.

The inventors of the present invention have examined conditions for further increasing the recording density by applying the above-described MSR technique to a magneto-optic recording medium utilizing a bismuth-substituted garnet film.

In the above-described MSR technique, masking of information in the recording layer and reading of the information are performed by utilizing a change in magnetic property of the readout layer, i.e., a magneto-optic Kerr effect of the readout layer which is substantially non-light-transmissive. If the readout layer is formed of a transparent material such as a garnet film, laser beam passes through the readout layer, so that the influence of magnetization of the recording layer cannot be avoided. Further, under the present magnetic material technology, it is necessary that the recording layer capable of being exchange-coupled with the readout layer formed of garnet is formed of garnet. If so, the recording layer is transparent like the readout layer. Accordingly, the laser light is influenced by the Faraday effect of the recording layer. That is, information in the recording layer is not completely masked with the readout layer, and there is a possibility of unnecessary information of recording marks in the laser spot irradiation area being detected as noise. Thus, the principle of MSR does not hold if the amorphous alloy film in the magneto-optic disk is simply replaced with a garnet film.

In view of this fact, the inventors of the present invention has concluded that the angle of Faraday rotation of the recording layer should be minimized to apply the MSR technique to the magneto-optic disk using a garnet film. Needless to say, it is desirable to maximize the angle of Faraday rotation of the readout layer. From this view point, an object of the present invention is to provide compositions of garnet films suitable for the readout and recording layers and a method of manufacturing a magneto-optic disk using these films.

It is generally known that the angle of Faraday rotation of a bismuth-substituted garnet film depends upon the bismuth (Bi) content, and that the Faraday rotation angle is increased if the bismuth (Bi) content is increased (H.Takeuchi et al., Japan. J. Appl. Phys. 12, 465 (1973)). Also, it is well known that the Curie temperature depends upon the content of a nonmagnetic element which can be substituted for iron (Fe) in garnet, and that the Curie temperature is reduced if the content of such an element is increased.

According to the present invention, a readout layer and a recording layer magnetically coupled with each other by quantum-mechanical exchange interaction are formed of a bismuth-substituted garnet represented by $Bi_x R_{3-1} My Fe_{5-y} O_{12}$ (where $0 \leq x < 3$, $0 \leq y < 2$, R is yttrium or a rare earth element, and M is an element which can be substituted for iron (Fe), and a nonbismuth-substituted garnet represented by $R_3 M_z Fe_{5-z} O_{12}$ (where $0 \leq z < 2$, R is an element which can be substituted for yttrium or a rare earth element, and M is an element which can be substituted for iron (Fe), respectively. These readout and recording layers, and a reflecting film are successively laminated on a transparent substrate to form a magneto-optic disk. Specifically, the compositions of the garnets are selected so that the readout layer has a smaller coercive force and a higher Curie temperature in comparison with the recording layer, and so that the angle of Faraday rotation of the readout layer with respect to light of a predetermined wavelength is 200 or more times that of the recording layer.

If x, y, and z in the composition of the readout layer represented by $Bi_x R_{3-x} My Fe_{5-y} O_{12}$ and the composition of the recording layer represented by $R_3 M_z Fe_{5-z} O_{12}$ are selected so that $0 \leq x < 3$, $0 \leq y < 2$, and $0 \leq z < 2$, the coercive forces, the Curie temperatures and the Faraday rotation angles of the readout and recording layers can be controlled in accordance with the desired relationships mentioned above.

DESCRIPTION OF THE PREFERRED EMBODIMENT

Figure 1A:
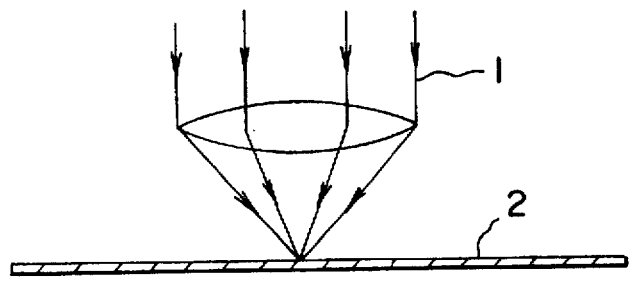
FIGS. 1(a) and 1(b) are a schematic cross-sectional views of an ordinary operation of writing on a magneto-optic disk.
Figure 1B:
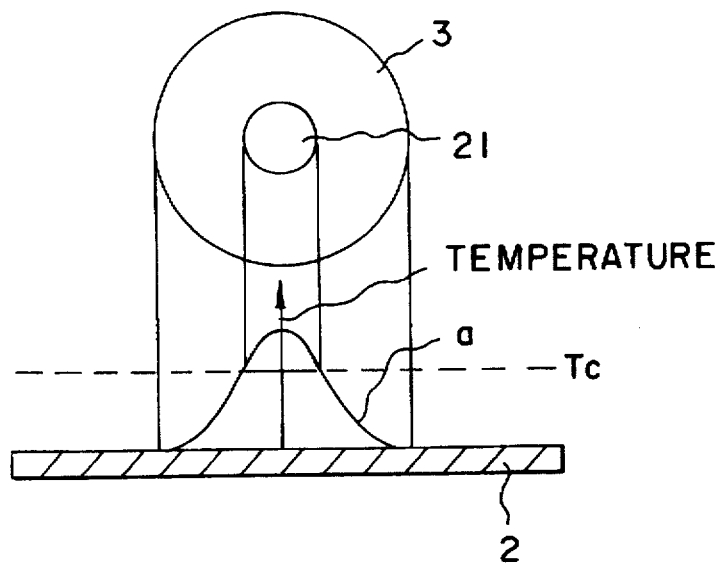
Figure 2:
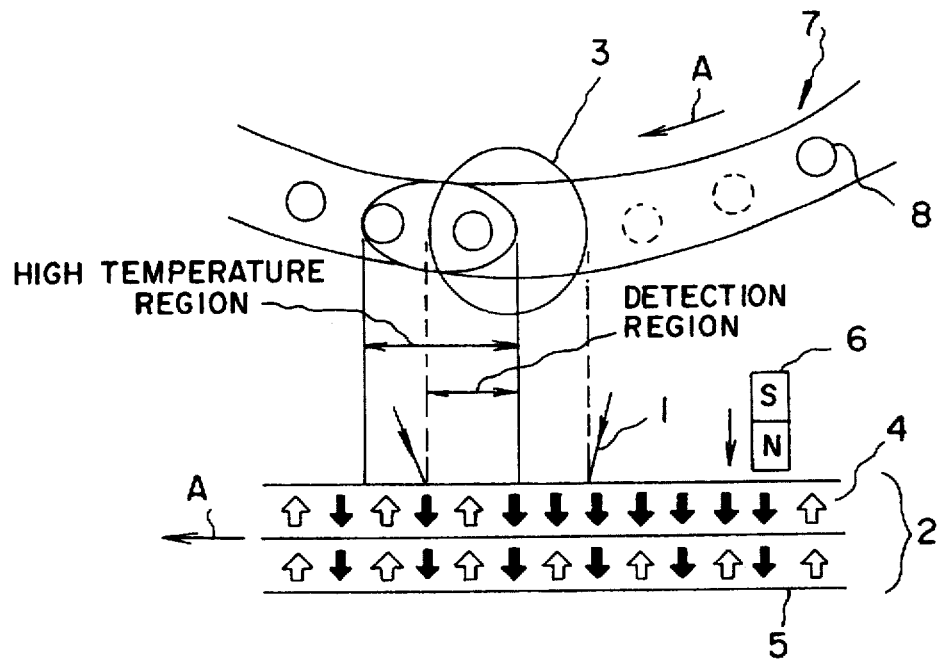
FIG. 2 is a diagram of the principle of the MSR technique.
Figure 3:
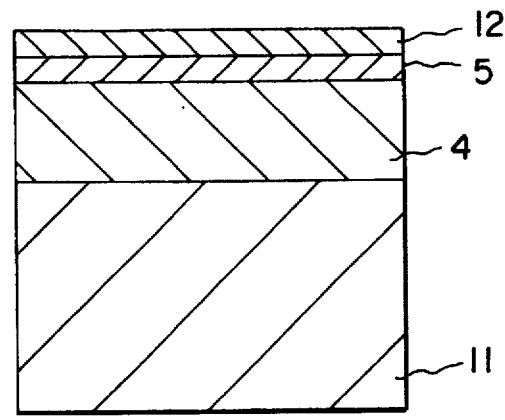
FIG. 3 is a schematic sectional view of the structure of a magneto-optic disk in accordance with the present invention.

A magneto-optic disk in accordance with the present invention has a structure, such as that schematically shown in FIG. 3 in section, in which, for example, a 0.25 μm thick readout layer 4 formed of a bismuth-substituted garnet film having a composition $Bi_2DyGa_{0.8}Fe_{4.2}O_{12}$, a 0.05 μm thick recording layer 5 formed of a nonbismuth-substituted garnet film having a composition $Dy_3Ga_{1.2}Fe_{3.8}O_{12}$, and a 0.07 μm thick reflecting film 12 formed of aluminum are successively laminated on a transparent substrate 11 having a diameter of 3 inches and a thickness of 0.5 mm and formed of a gadolinium-gallium-garnet ($Gd_3Ga_5O_{12}$, hereinafter referred to simply as GGG) crystal.

An example of a method of forming the readout layer 4 and the recording layer 5 by sputtering will be described below.

For example, a high-frequency dipole magnetron sputtering apparatus is used to sputter targets to a transparent substrate formed of GGG, such as that mentioned above, and having a diameter of 3 inches, while the substrate is being heated at 550° C. in argon gas containing 10% by volume of oxygen. Each of the targets for forming the above-described readout and recording layers is formed into the shape of a plate by sintering a powder having the same composition as the corresponding layer. The target for the readout layer is first sputtered and the target for the recording layer is then set in place of the target for the readout layer to be sputtered.

This sputtering is controlled so as to satisfy conditions that the pressure of the sputtering gas is within the range of 0.3 to 3 Pa, the deposition speed is within the range of 30 to 80 Å/minute, and the substrate heating temperature is within the range of 510° to 600° C. Uniform microcrystalline garnet films having axes of easy magnetization set in accordance with the crystal orientation of the substrate surface are thereby formed. As a result, garnet films having an S/N ratio of 45 dB or higher, which is required with respect to practical magneto-optic disks in terms of the carrier-noise ratio (C/N) which is a well-known factor of the performance of magneto-optic recording mediums. Sputtering conditions, such as those described above, are disclosed as conditions in accordance with a method of crystallizing a garnet film during deposition in the Japanese Patent Laid-Open publication 2-239448 of a patent application filed by the inventors of the present invention.

For example, the reflecting film 12 formed of aluminum may be formed by the ordinary vacuum deposition method. The reflecting film 12 is not only necessary for returning, at the time of readout, a laser beam to an optical head (not shown) containing a laser source and an optical detector, but also contributes to increase a recording sensitivity. That is, the reflecting film 12 absorbs a part of the laser beam at the time of recording. Heat thereby generated is transmitted to the two-layer-structure garnet films, and the temperature of the magneto-optic recording medium is easily increased to a predetermined temperature. It is thereby possible to perform recording with a laser beam of a low energy level.

Table 1 shows examples of magnetic characteristics of readout and recording layers singly formed on a GGG substrate by sputtering under the above-described conditions.

TABLE 1

|  | Chem. Composition | Tc*[1] (°C.) | Tcomp*[2] (°C.) | Hc*[3] (KOe) |
|---|---|---|---|---|
| Readout Layer | $Bi_2DyGa_{0.8}Fe_{4.2}O_{12}$ | 200 | −180 | 2 |
| Recording Layer | $Dy_3Ga_{1.2}Fe_{3.8}O_{12}$ | 150 | 20 | >10 |

*[1]Curie Temp.,
*[2]Compensation Temp.,
*[3]Coercive Force

Figure 4:
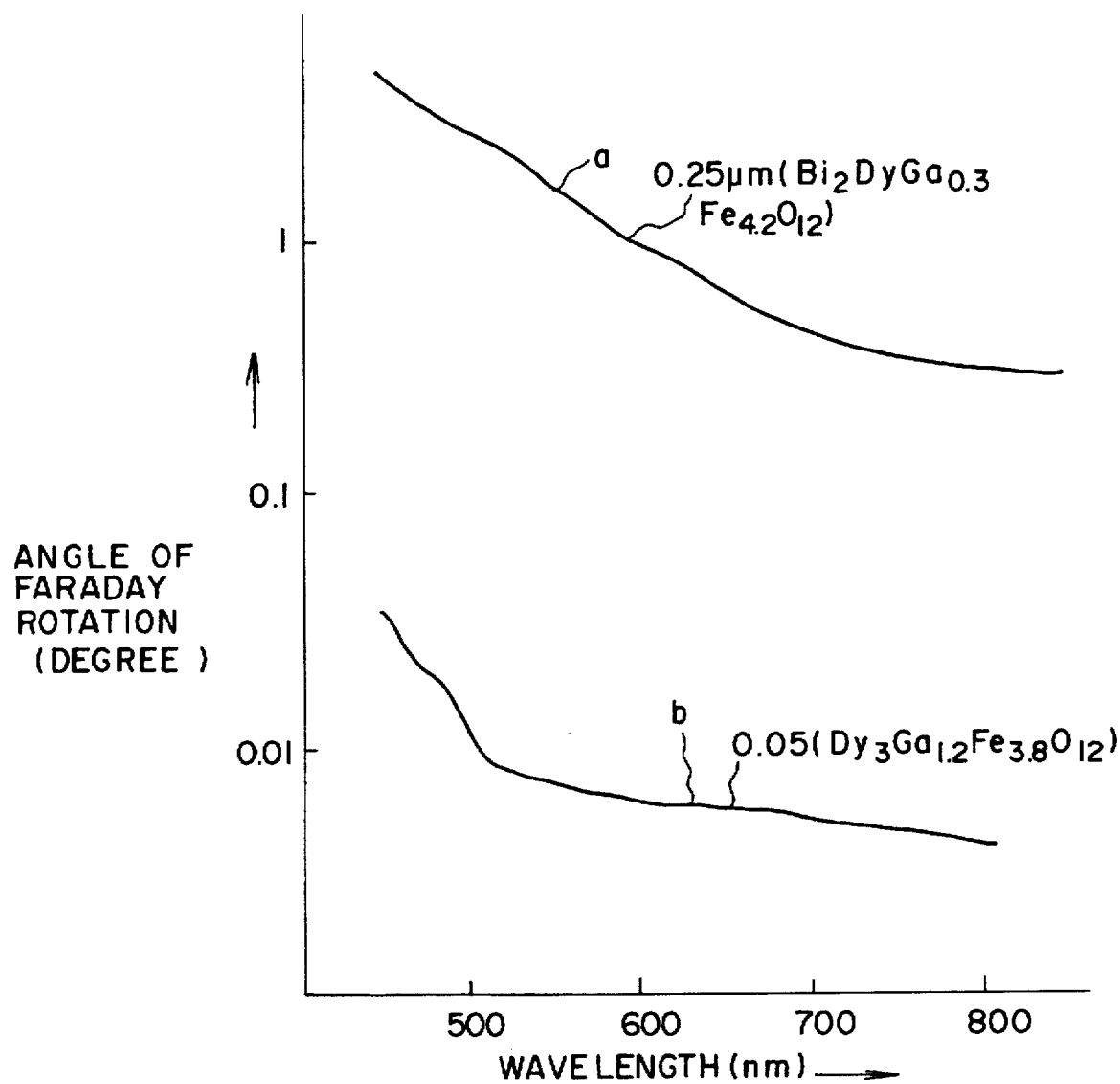
FIG. 4 is a graph showing an example of a wavelength dependency of the Faraday rotation of a readout layer and a recording layer in the magneto-optic disk in accordance with the present invention.

FIG. 4 shows wavelength-dependency characteristics of the angle of Faraday rotation of the readout layer (0.25 μm thick) and the recording layer (0.05 μm thick) shown in Table 1. In the wavelength range of 500 to 800 nm, the angle of Faraday rotation of the readout layer formed of the bismuth-substituted garnet is 200 or more times that of the recording layer formed of the nonbismuth-substituted garnet. The ratio of the Faraday rotation angles is higher at the short-wavelength side, and is about 280 at a wavelength of 500 nm.

The Faraday rotation angle ratios of 200 and 280 correspond to 46 dB and 48 dB in terms of the C/N ratio mentioned above. As mentioned above, a C/N ratio of 45 dB or higher suffices in practice. In the magneto-optic disk in accordance with the present invention, information in the recording layer can be regarded as substantially masked with the readout layer.

Figure 5:
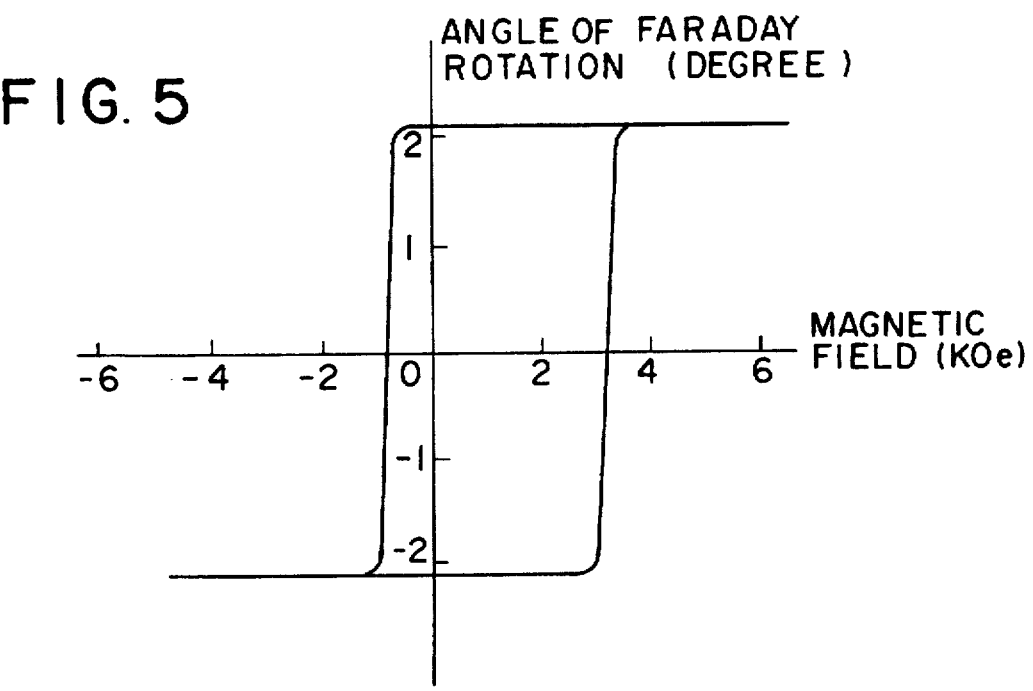
FIG. 5 is a graph showing an example of the relationship between the angle of Faraday rotation of the magneto-optic disk in accordance with the present invention and an external magnetic field.

FIG. 5 is a graph showing the relationship between the angle of Faraday rotation of a magneto-optic recording medium formed by laminating the readout layer and the recording layer shown in Table 1 and the intensity of an external magnetic field. As shown in FIG. 5, this magneto-optic recording medium has a hysteresis loop of squareness ratio of 1. This hysteresis loop is asymmetric with respect to the external magnetic field, which indicates that the readout layer and the recording layer are exchange-coupled.

The invention described above is summarized below. The coercive force of the readout layer is smaller than that of the recording layer and, therefore, can be initialized with a magnetic field which does not cause magnetization reversal in the recording layer. The Curie temperature of the readout layer is higher than that of the recording layer, and the readout layer has a large bismuth content. It is thereby possible to increase the Faraday rotation of the readout layer 200 or more times that of the recording layer. The higher Curie temperature of the readout layer than that of the recording layer allows to maintain that the ratio of the angles of Faraday rotation of the readout layer and the recording layer to be 200 or higher even at the temperature at which reading is performed. As a result, information written in the recording layer can be masked almost completely, although the readout layer is transparent.

Figure 6:
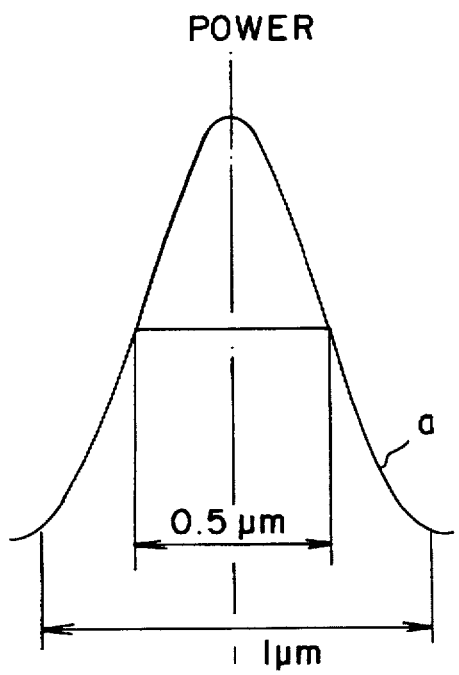
FIG. 6 is a power profile of a laser beam used to test characteristics of the magneto-optic disk in accordance with the present invention.

Information was recorded on and read out of the magneto-optic disk having the readout layer and the recording layer in accordance with the present invention with an argon laser beam having a wavelength of 514 nm. It was confirmed that the operation was performed in accordance with the principle of MSR. This argon laser beam has a power profile such as that indicated by a curve a in FIG. 6. That is, the laser spot on the magneto-optic disk has a diameter of 1 μm and a half width of 0.5 μm. Recording marks having a diameter of 0.25 μm and arranged at a pitch of 0.5 μm on the magneto-optic disk were detected at a C/N ratio of 40 dB by this laser beam.

According to the present invention, a short-wavelength laser source having a wavelength of 500 nm is used to increase the recording density 2.6 times in terms of line density with respect to a magneto-optic disk with a laser light source having a wavelength of 800 nm. It is generally said that, by the application of the MSR technique, an increase in the recording density by about 6 times, which is the sum of increases in the line and track densities, can be achieved. In combination of this effect, the present invention can achieve recording of 2.6×6 times-, i.e., about 16 times-higher density.

In the above-described embodiment, a bismuth-substituted garnet having a composition $Bi_2DyGa_{0.8}Fe_{4.2}O_{12}$ is used as a readout layer, and a nonbismuth-substituted garnet having a composition $Dy_3Ga_{1.2}Fe_{3.8}O_{12}$ is used as a recording layer. However, other garnets, for example, a bismuth-substituted garnet having a composition $Bi_2DyGaFe_4O_{12}$ and a nonbismuth-substituted garnet having a composition $Dy_2TbAlFe_4Ol_2$, may be used for a readout layer and a recording layer, respectively.

We claim:

1. A high-density magneto-optic disk comprising a substrate and a readout layer, each of which is transparent to a laser beam for reading out recorded data on a recording layer through a mask of magnetically induced super resolution on said readout layer, wherein a transparent substrate;

said readout layer is formed of a bismuth-substituted garnet represented by a chemical formula $Bi_xR_{3-x}M_yFe_{5-y}O_{12}$ and is formed on the substrate;

said recording layer is formed of a nonbismuth-substituted garnet represented by a chemical formula $R_3M_zFe_{5-z}O_{12}$ and is formed on the readout layer and is magnetically coupled with the readout layer at the interface therebetween by an exchange interaction; and a reflection layer formed on the recording layer, for reflecting the laser beam passing through said readout layer and said recording layer, wherein x, y and z have values defined by 0<x<3, 0≦y<2 and 0≦z<2, respectively, R represents an element selected from a group of yttrium and rare-earth elements, and M is selected from the group consisting of Ga and Al, wherein the readout layer has a smaller coercive force and a higher Curie temperature compared with those of the recording layer and the recording layer exhibits characteristics such that the angle of Faraday rotation thereof is 1/200 of that of the readout layer or less.

* * * * *